(12) United States Patent
Morales Delgadillo et al.

(10) Patent No.: US 12,735,275 B2
(45) Date of Patent: Sep. 15, 2026

(54) TILT TRAY SORTER

(71) Applicant: Intelligrated Headquarters, LLC, Mason, OH (US)

(72) Inventors: Pedro Morales Delgadillo, Mexico City (MX); Jaime Enrique Legarreta Seyffert, Mexico City (MX); Ricardo Mercado Cordero, Mexico City (MX)

(73) Assignee: Intelligrated Headquarters, LLC, Mason, OH (US)

(*) Notice: Subject to any disclaimer, the term of this patent is extended or adjusted under 35 U.S.C. 154(b) by 8 days.

(21) Appl. No.: 18/585,657

(22) Filed: Feb. 23, 2024

(65) Prior Publication Data

US 2025/0271054 A1 Aug. 28, 2025

(51) Int. Cl.
*B65G 47/96* (2006.01)

(52) U.S. Cl.
CPC .................................. *B65G 47/962* (2013.01)

(58) Field of Classification Search
CPC .... B65G 47/96; B65G 47/962; B65G 47/965; B65G 47/967
See application file for complete search history.

(56) References Cited

U.S. PATENT DOCUMENTS 4,722,430 A * 2/1988 Canziani .............. B65G 47/962 198/374
6,326,755 B1 12/2001 Babbs et al.
6,712,194 B1 3/2004 Abildgaard et al.
6,874,614 B2 * 4/2005 Heitplatz ............. B65G 47/962 209/912

(Continued)

FOREIGN PATENT DOCUMENTS

CN 205952877 U * 2/2017
CN 108789371 A 11/2018

(Continued)

OTHER PUBLICATIONS

Youtube, "Robotics | Backdrivability and speed test of Harmonic Drive-based robotic actuator", retrieved from the Internet at URL: <https://www.youtube.com/watch?v=So9PoP3rqKo&ab_channel=OleksandrStepanenko> on Apr. 1, 2024, 3 pages.
Extended European Search Report Mailed on Jul. 1, 2025 for EP Application No. 25154907, 12 page(s).

*Primary Examiner* — Bobby Rushing, Jr.
(74) *Attorney, Agent, or Firm* — Alston & Bird LLP

(57) ABSTRACT

A tilt tray sorter is disclosed. The tilt tray sorter comprises a housing and a tray coupled to the housing. A strain wave gear is positioned within the housing. The strain wave gear comprises a wave generator coupled to a motor, and the wave generator is configured to rotate upon actuation of the motor. Further, the strain wave gear comprises a flexspline mounted around the wave generator and a circular spline positioned around the flexspline. The flexspline is configured to rotate within the circular spline in response to the rotation of the wave generator. Further, the tilt tray sorter comprises a tilt tray shaft assembly coupled to the flexspline of the strain wave gear. The tilt tray shaft assembly is configured to rotate when the flexspline rotates. The housing and the tray are configured to pivot when the tilt tray shaft assembly is rotated.

17 Claims, 10 Drawing Sheets

(56) References Cited

U.S. PATENT DOCUMENTS

| | | | | |
|---|---|---|---|---|
| 6,962,088 | B2 * | 11/2005 | Horiuchi | F16H 49/001 73/862.338 |
| 7,284,654 | B2 * | 10/2007 | Affaticati | B65G 47/962 198/370.04 |
| 7,431,164 | B2 * | 10/2008 | Groot | B65G 47/962 198/621.3 |
| 8,727,103 | B2 * | 5/2014 | Vitalini | B65G 47/962 198/370.03 |
| 9,409,725 | B2 * | 8/2016 | Stikkelorum | B65G 47/40 |
| 9,481,529 | B2 * | 11/2016 | Berdelle-Hilge | B65G 47/962 |
| 2014/0217855 | A1 * | 8/2014 | Shibamoto | F16H 49/001 310/339 |
| 2019/0170165 | A1 | 6/2019 | Chung et al. | |

FOREIGN PATENT DOCUMENTS

| | | | | | |
|---|---|---|---|---|---|
| CN | 109095095 | A | | 12/2018 | |
| CN | 114483885 | A | | 5/2022 | |
| DE | 10021236 | A1 | | 11/2001 | |
| DE | 102014226822 | A1 | * | 6/2016 | |
| EP | 1443004 | A1 | | 8/2004 | |
| EP | 3150329 | A1 | | 4/2017 | |
| JP | 62-021621 | A | | 1/1987 | |
| JP | 2003-014060 | A | | 1/2003 | |
| KR | 10-1273607 | B1 | | 6/2013 | |
| KR | 10-2326544 | B1 | | 11/2021 | |
| WO | WO-0160674 | A1 | * | 8/2001 | B61B 13/12 |

* cited by examiner

TILT TRAY SORTER

FIELD OF THE DISCLOSURE

The present invention relates to sorting systems, and more particularly relates to a tilt tray sorter.

BACKGROUND

Tilt tray sorters are widely utilized in the field of materials handling and logistics. Existing tilt tray sorters include numerous components, such as expansion joints and drive chains. The complexity of the existing tilt tray sorters may result in frequent maintenance, which may increase the cost of operating the sorting system.

The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

The following presents a simplified summary in order to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

In one example embodiment, a tilt tray sorter is disclosed. The tilt tray sorter comprises a housing and a tray coupled to the housing. A strain wave gear is positioned within the housing. The strain wave gear comprises a wave generator coupled to a motor, and the wave generator is configured to rotate upon actuation of the motor. Further, the strain wave gear comprises a flexspline mounted around the wave generator and a circular spline positioned around the flexspline. The flexspline is configured to rotate within the circular spline in response to the rotation of the wave generator. Further, the tilt tray sorter comprises a tilt tray shaft assembly coupled to the flexspline of the strain wave gear. The tilt tray shaft assembly is configured to rotate when the flexspline rotates. The housing and the tray are configured to pivot when the tilt tray shaft assembly is rotated.

In some embodiments, the circular spline is fabricated with an inner gear profile and the flexspline is fabricated with an outer gear profile.

In some embodiments, the flexspline is positioned within the circular spline such that the outer gear profile of the flexspline meshes with the inner gear profile of the circular spline to provide the rotational movement to the flexspline.

In some embodiments, the wave generator has an elliptical shaped profile, wherein the rotation of the wave generator facilities to create a wave within the flexspline that causes a relative movement between the flexspline and the circular spline due to the meshing of the outer gear profile of the flexspline and the inner gear profile of the circular spline.

In some embodiments, the tilt tray shaft assembly comprises a shaft, the shaft comprising a flange and a gear. The flange is coupled to the flexspline. The gear comprises an outer gear profile that meshes with an inner gear profile of the housing of the tilt tray sorter.

In some embodiments, each gear rotates within a predefined path monolithic within the housing to facilitate rotation of the tray at one or more predefined angles. In some embodiments, the one or more predefined angles correspond to 1 to 45 degrees.

In some embodiments, the motor is communicatively coupled to one or more processors embedded within the strain wave gear. In some embodiments, the one or more processors are configured to send a signal or a command to the motor for titling the tray.

In some embodiments, the flexspline is configured to increase torque and reduce speed in comparison to the motor.

In some embodiments, the motor corresponds to a direct current (DC) motor.

In another example embodiment, a strain wave gear for a tilt tray sorter is disclosed. The strain wave gear comprises a wave generator coupled to a motor, and the wave generator is configured to rotate upon actuation of the motor. A flexspline is mounted around the wave generator, and a circular spline positioned around the flexspline. The flexspline is configured to rotate within the circular spline in response to the rotation of the wave generator. A tilt tray shaft assembly is coupled to the flexspline. The tilt tray shaft assembly is configured to rotate when the flexspline rotates.

In some embodiments, one or more processors are communicatively coupled to the motor. The one or more processors are configured to send a signal or a command to the motor for titling the tray at the one or more predefined angles.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRA WINGS

Having thus described certain example embodiments of the present disclosure in general terms, reference will hereinafter be made to the accompanying drawings, which are not necessarily drawn to scale, and wherein:

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. As discussed herein, the protection devices may be referred to use by humans, but may also be used to raise and lower objects unless otherwise noted.

The components illustrated in the figures represent components that may or may not be present in various embodiments of the invention described herein such that embodiments may include fewer or more components than those shown in the figures while not departing from the scope of the invention. Some components may be omitted from one or more figures or shown in dashed line for visibility of the underlying components.

The present disclosure provides various embodiments of tilt tray sorter. Embodiments of the tilt tray sorter may include a strain wave gear that may have a wave generator coupled to a motor. Embodiments may include the wave generator configured to rotate upon actuation of the motor. Embodiments may include the flexspline that is configured to rotate within the circular spline in response to the rotation of the wave generator. In various embodiments, a tilt tray shaft assembly is configured to rotate when the flexspline rotates. Embodiments may be configured to tilt a tray with respect to the rotation of the tilt tray shaft assembly in a plurality of angles.

Figure 1:
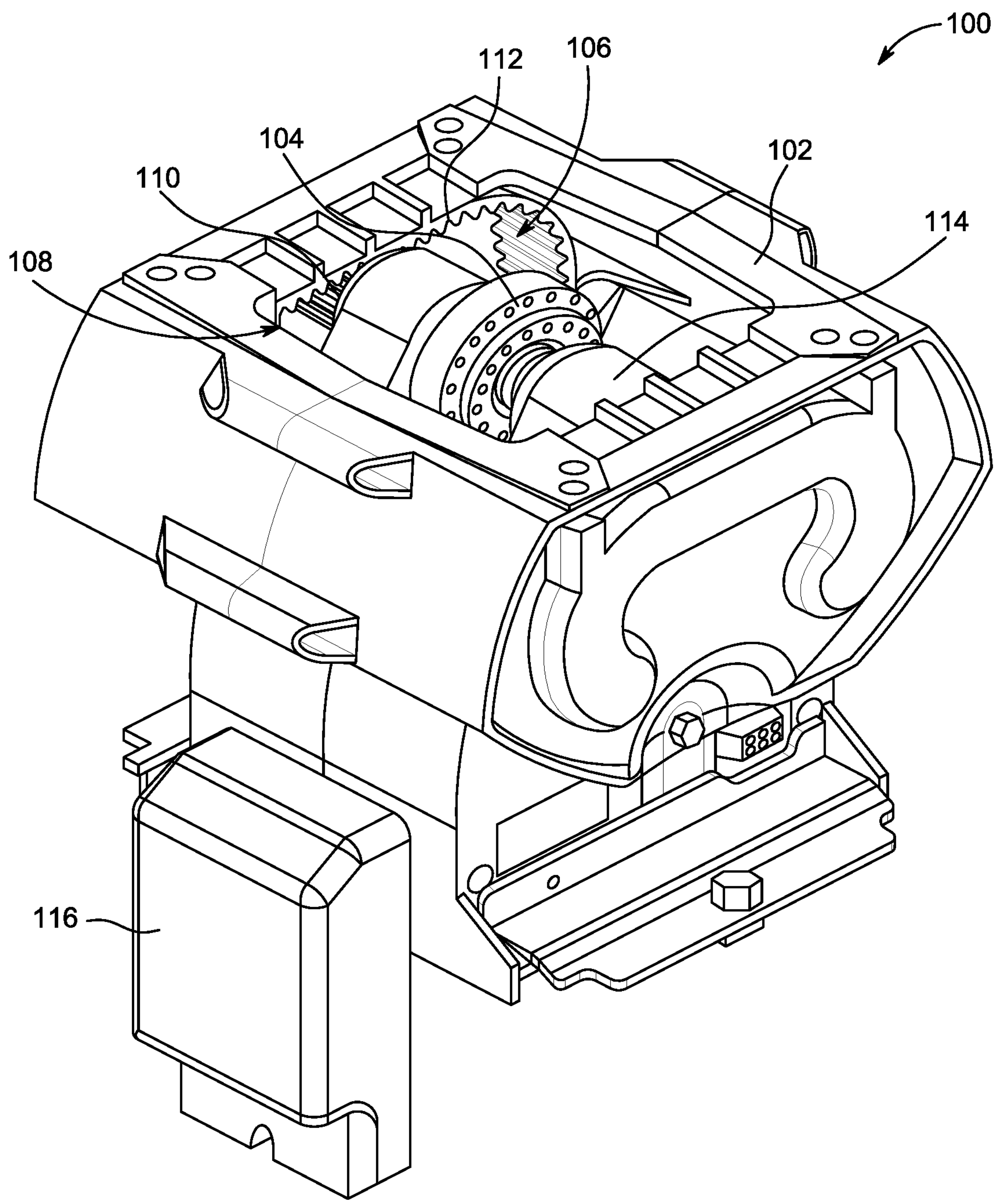
FIG. 1 illustrates an isometric view of a tilt tray sorter in accordance with an example embodiment of the present disclosure.

FIG. 1 illustrates an isometric view of a tilt tray sorter 100, in accordance with an example embodiment of the present disclosure.

The tilt tray sorter 100 may comprise a housing 102 and a tray 404 (FIG. 4B) coupled to the housing 102. Further, the tilt tray sorter 100 may comprise a strain wave gear 104. In some embodiments, the tilt tray sorter 100 may be referred as tilt tray sorting mechanism having a tilting mechanism induced by way of the strain wave gear 104. Further, the strain wave gear 104 may be positioned within the housing 102. In some embodiments, the strain wave gear 104 may be configured to rotate the tray 404 to unload or divert packages placed over the tray 404. In various embodiments, the tray 404 may be referred as a tilt tray that may follow is tilting action induced by rotational motion of the strain wave gear 104. The tray 404 and its tilting action with respect to the rotational motion will be described later in conjunction with FIGS. 4B-4C.

Figure 3A:
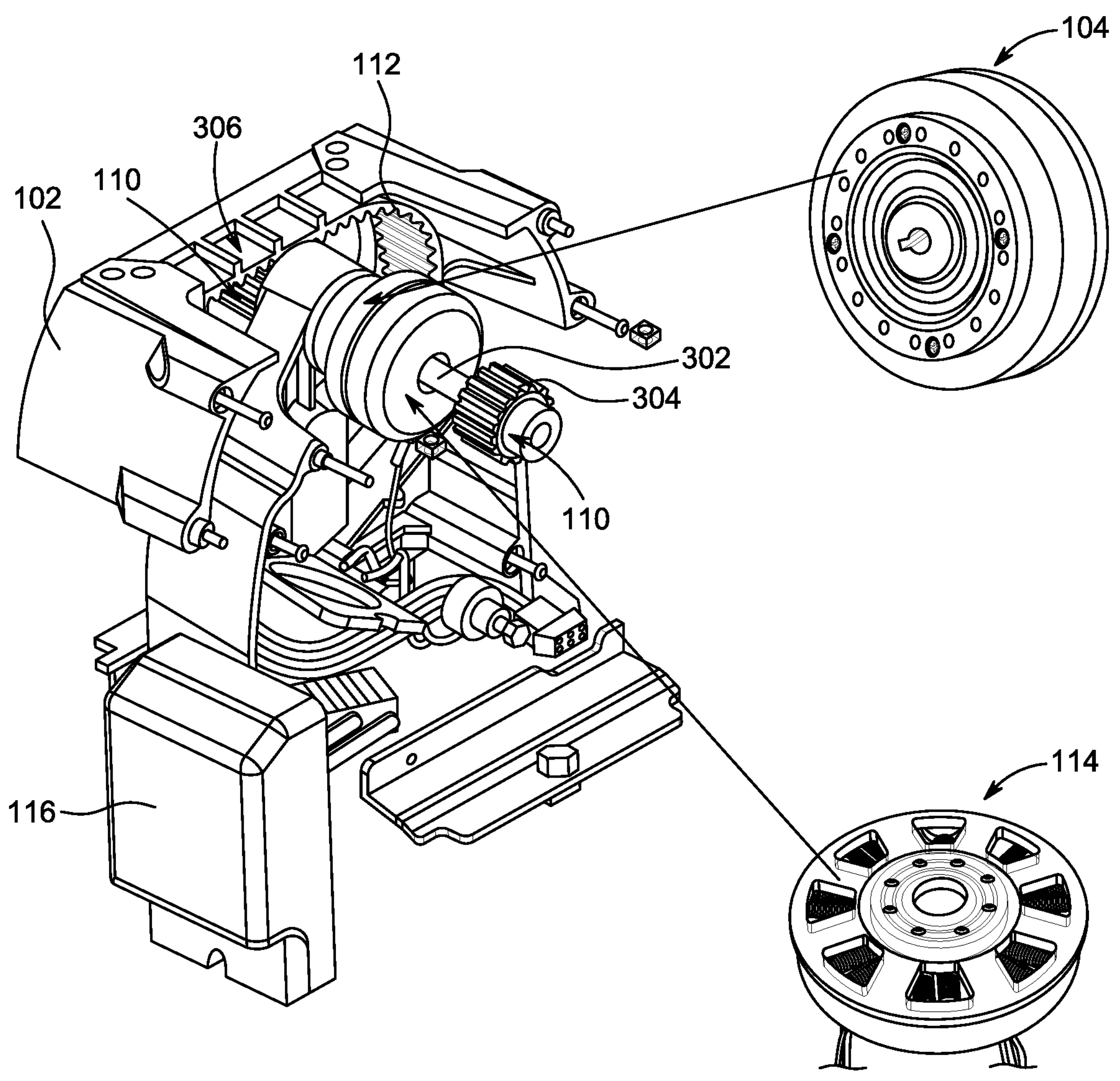
FIG. 3A illustrates a sectional view of the tilt tray sorter in accordance with an example embodiment of the present disclosure.

Further, the tilt tray sorter 100 may comprise a tilt tray shaft assembly 106 that may be coupled to the strain wave gear 104. The tilt tray shaft assembly 106 may be configured to rotate when the strain wave gear 104 rotates. The housing 102 and the tray 404 may be configured to pivot when the tilt tray shaft assembly 106 may be rotated. Further, the tilt tray shaft assembly 106 may comprise a shaft 302 (FIG. 3A). The shaft 302 may comprise a flange 108 and a gear 110. The flange 108 may be coupled to the strain wave gear 104. Further, the gear 110 may comprise an outer gear profile 304 (FIG. 3A) that may be configured to mesh with an inner gear profile 112 of the housing 102 of the tilt tray sorter 100.

Further, the tilt tray sorter 100 may comprise a motor 114 that may be coupled to the strain wave gear 104. In some embodiments, the motor 114 may correspond to a direct current (DC) motor. The motor 114 may actuate the strain wave gear 104, and the shaft 302 of the tilt tray shaft assembly 106 may rotate. The rotational motion of the shaft 302 may be transferred to the gear 110, which may impart motion to the inner gear profile 112 of the housing 102. In some embodiments, the gear 110 may rotate within a predefined path monolithic within the housing 102. Further, the rotation of the gear 110 provides a pivoted movement to the housing 102 that further facilitates rotation of the tray 404 at one or more predefined angles. In some example embodiments, the one or more predefined angles correspond to 1 to 45 degrees.

Further, the tilt tray sorter 100 may comprise one or more processors 116 that may be communicatively coupled to the motor 114. In some embodiments, the one or more processors 116 may be configured to send a signal or a command to the motor 114 for titling the tray 404 at required intervals. In some embodiments, the one or more processors 116 may include processing circuitry, input/output circuits, a memory, etc., disposed over a circuit board, e.g., a processing circuit board or plastic circuit board.

The one or more processors 116 may include suitable logic, circuitry, and/or interfaces that are operable to execute one or more instructions stored in the memory to perform predetermined operations. In one embodiment, the one or more processors 116 may be configured to decode and execute any instructions received from one or more other electronic devices or server(s). The one or more processors 116 may be configured to execute one or more computer-readable program instructions, such as program instructions to carry out any of the functions described in this description. Further, the processor may be implemented using one or more processor technologies known in the art. Examples of the one or more processors 116 include, but are not limited to, one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor).

In some embodiments, the memory may be configured to store one or more parameters related to the one or more predefined angles for rotation of the tray 404 as desired. Further, the memory may be configured to store a set of instructions and data executed by the one or more processors 116. Further, the memory may include the one or more instructions that are executable by the one or more processors 116 to perform specific operations. It is apparent to a person with ordinary skill in the art that the one or more instructions stored in the memory enable the hardware of the tilt tray sorter 100 to perform the predetermined operations. Some of the commonly known memory implementations include, but are not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

Figure 2A:
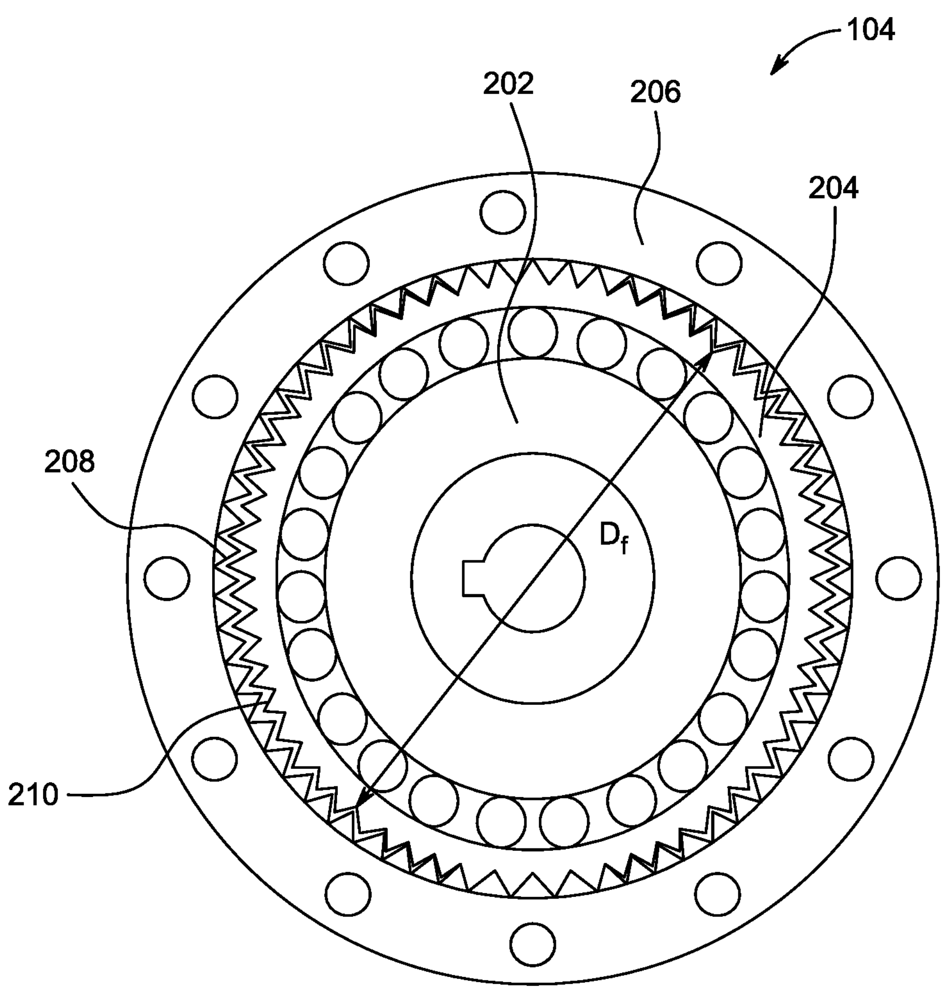
FIG. 2A illustrates a front view of strain wave gear for the tilt tray sorter in accordance with an example embodiment of the present disclosure.
Figure 2B:
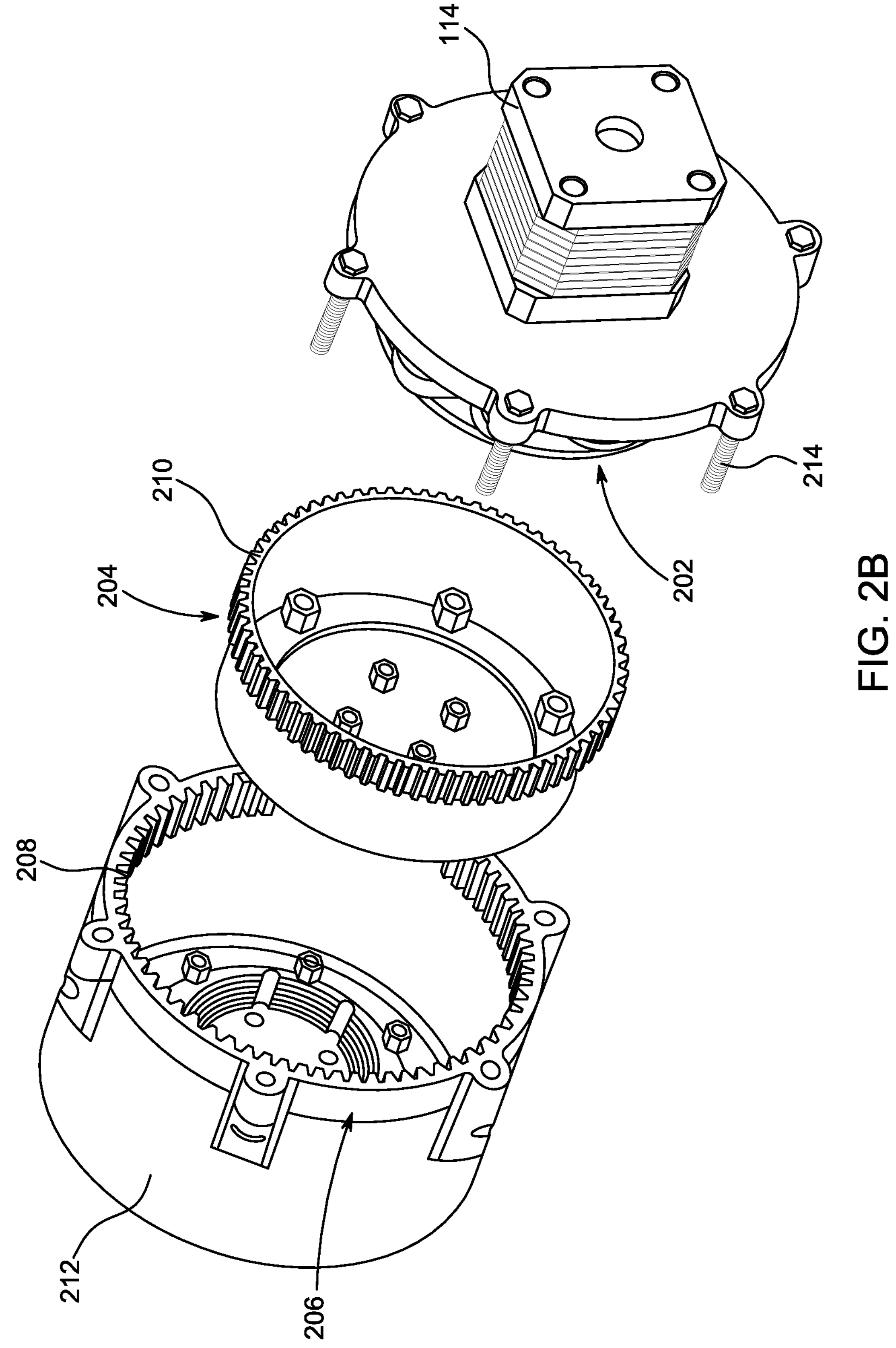
FIG. 2B illustrates an exploded view of the strain wave gear for the tilt tray sorter and a motor in accordance with an example embodiment of the present disclosure.
Figure 2C:
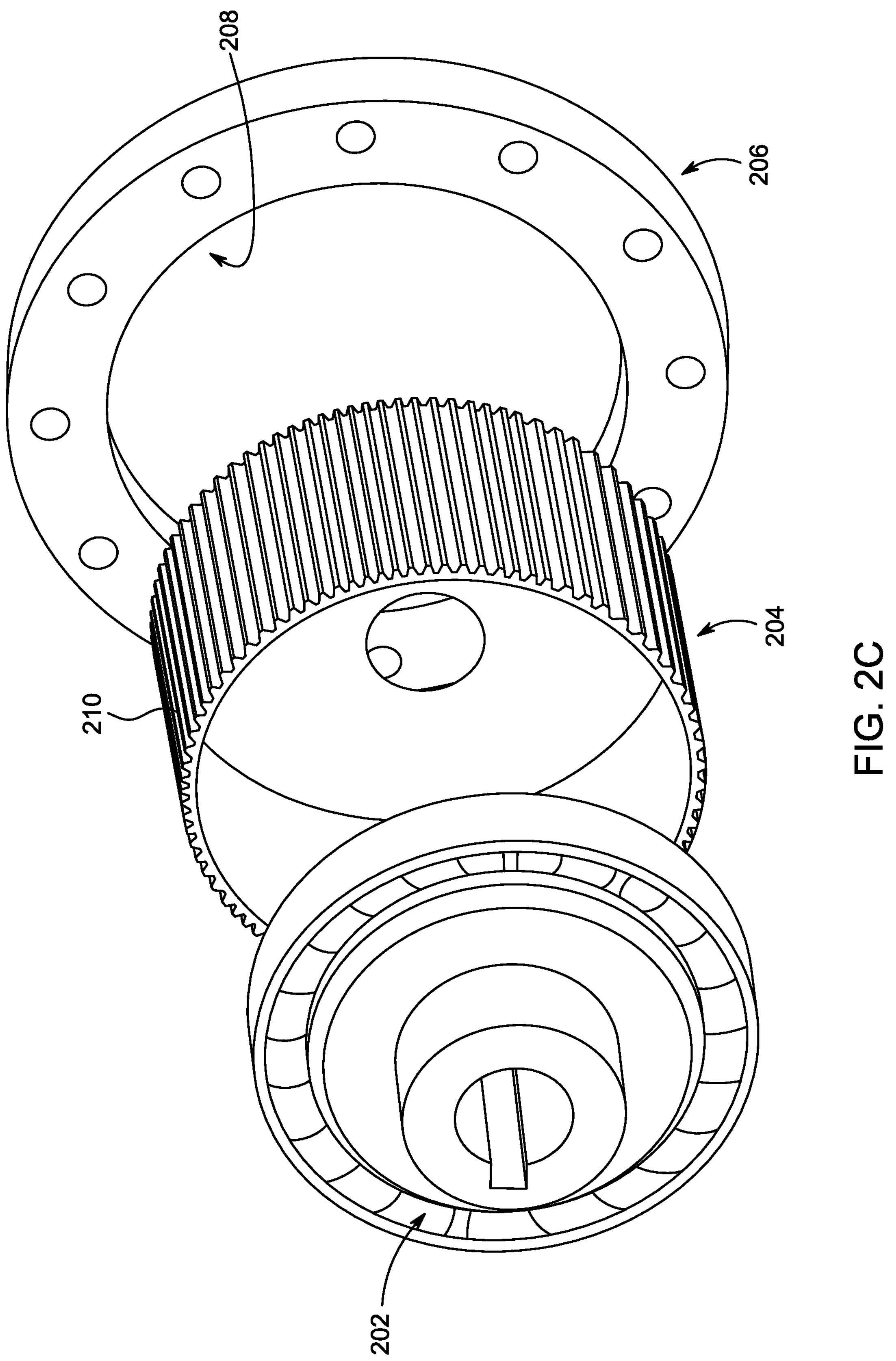
FIG. 2C illustrates another exploded view of the strain wave gear for the tilt tray sorter in accordance with an example embodiment of the present disclosure.
Figure 2D:
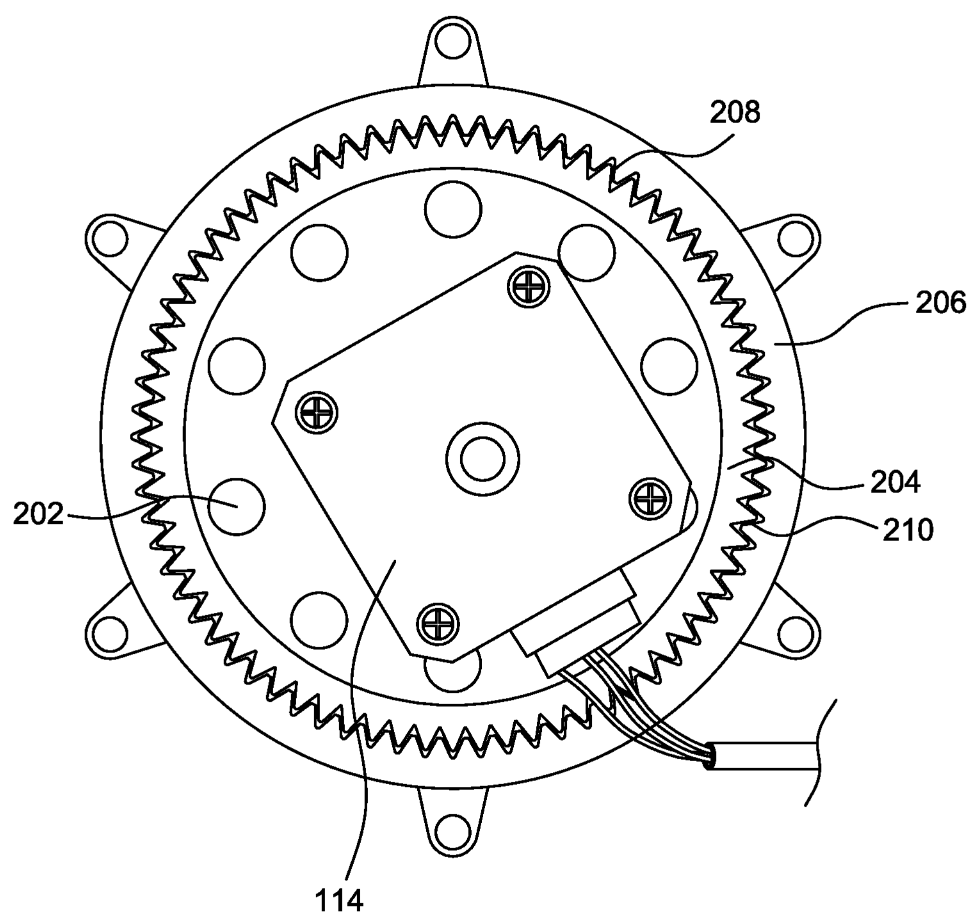
FIG. 2D illustrates another front view of the strain wave gear for the tilt tray sorter coupled with the motor in accordance with an example embodiment of the present disclosure.

FIG. 2A illustrates a front view of the strain wave gear 104 for the tilt tray sorter 100, in accordance with an example embodiment of the present disclosure. FIG. 2B illustrates an exploded view of the strain wave gear 104 for the tilt tray sorter 100 with the motor 114, in accordance with an example embodiment of the present disclosure. FIG. 2C illustrates another exploded view of the strain wave gear 104 for the tilt tray sorter 100, in accordance with an example embodiment of the present disclosure. FIG. 2D illustrates another front view of the strain wave gear 104 for the tilt tray sorter 100 coupled to the motor 114, in accordance with an example embodiment of the present disclosure. FIGS. 2A-2D are described in conjunction with FIG. 1.

The strain wave gear 104 may comprise a wave generator 202 that may be coupled to the motor 114. The wave generator 202 may be configured to rotate upon actuation of the motor 114. Further, the strain wave gear 104 may comprise a flexspline 204 mounted around the wave generator 202 and a circular spline 206 that may be positioned around the flexspline 204. The flexspline 204 may be configured to rotate within the circular spline 206 in response to the rotation of the wave generator 202. Further, the circular spline 206 may be fabricated with an inner gear profile 208 and the flexspline 204 may be fabricated with an outer gear profile 210. In some embodiments, the flexspline 204 may be positioned within the circular spline 206 such that the outer gear profile 210 of the flexspline 204 may mesh with the inner gear profile 208 of the circular spline 206 to provide the rotational movement to the flexspline 204.

In some embodiments, the wave generator 202 may correspond to an elliptical shaped profile. The rotation of the wave generator 202 may facilitate to create a wave within the flexspline 204 that may cause a relative movement between the flexspline 204 and the circular spline 206 due to the meshing of the outer gear profile 210 of the flexspline 204 and the inner gear profile 208 of the circular spline 206. In some embodiments, the flexspline 204 may be placed inside the wave generator 202 and may deform into the elliptical shape as the wave generator 202. Since the flexspline 204 is deformed elliptically, teeth of the outer gear profile 210 of the flexspline 204 may actually mesh with the teeth of the inner gear profile 208 of the circular spline 206 in two regions in opposite sides of the flexspline 204.

In some embodiments, as the wave generator 202 rotates, the teeth of the flexspline 204 that are meshed with the teeth of the circular spline 206 slowly change position. In some embodiments, the inner gear profile 208 of the circular spline 206 may have more teeth than the outer gear profile 210 of the flexspline 204. In some embodiments, the difference in teeth between the outer gear profile 210 and the inner gear profile 208 may allow the flexspline 204 to rotate slightly backward relative to the circular spline 206 for every full rotation of the wave generator 202. Thereby, the rotation action of the wave generator 202 may result in a much slower rotation of the flexspline 204 in the opposite direction.

The slower rotation of the flexspline 204 in the opposite direction, may generate reduction needed in the flexspline 204. In some embodiments, the flexspline 204 may be configured to increase torque and reduce speed in comparison to the rotational movement of the motor 114. As discussed, the tilt tray shaft assembly 106 may be coupled to the flexspline 204 of the strain wave gear 104. The tilt tray shaft assembly 106 may be configured to rotate when the flexspline 204 rotates. In some embodiments, the housing 102 and the tray 404 may be configured to pivot when the tilt tray shaft assembly 106 may be rotated. It may be noted that the wave generator 202 may be a point of contact between the motor 114 and the strain wave gear 104.

As illustrated in FIG. 2B, the strain wave gear 104 may comprise a casing 212 attached to the circular spline 206. The flexspline 204 may be enclosed within the casing 212 with the outer gear profile 210 of the flexspline 204 meshing with the inner gear profile 208 of the circular spline 206. Further, the wave generator 202 may be coupled to the casing 212 using a plurality of fasteners 214. In some embodiments, the plurality of fasteners 214 may be long threaded screws configured to secure the casing 212 and the wave generator 202. Further, the motor 114 may be coupled to the wave generator 202. In various embodiments, the wave generator 202 and the motor 114 may be referred as the wave generator 202, due to the effect of producing rotational motion, that may be further transferred to the flexspline 204. In some cases, the motor 114 may include a worm gear (not shown). As illustrated in FIG. 2C, the outer gear profile 210 of the flexspline 204 may have width greater than the inner gear profile 208 of the circular spline 206. Such difference in width of the outer gear profile 210 and the inner gear profile 208 may be provided, such that the circular spline 206 may have rotational motion back and forth along the width of the flexspline 204.

As illustrated in FIG. 2A, the flexspline 204 may get deformed in an elliptical shape due to the elliptical shape of the wave generator 202. Further, the outer gear profile 210 of the flexspline 204 may mesh with the inner gear profile 208 of the circular profile 206. The rotation movement generated by the wave generator 202 may be transmitted to the flexspline 204, and therefore, a reduction may be made. Such reduction may be due to the shape of the flexspline 204 in comparison to the circular spline 206, as discussed earlier. It may be noted that the reduction may be evaluated by taking a negative difference of teeth between the outer gear profile 210 of the flexspline 204 and the inner gear profile 208 of the circular spline 206 and dividing the difference with the teeth of the outer gear profile 210 of the flexspline 204. For example, 200-202/200=−0.01. Therefore, the flexspline 204 may rotate at $1/100^{th}$ the speed of the wave generator 202 in the opposition direction. In some embodiments, due to the reduction of the flexspline 204, the rotational motion of the flexspline 204 may form a wavy structure. In some embodiments, the outer gear profile 210 of the flexspline 204 may mesh at least two contact points 216 on the inner gear profile 208 of the circular spline 206.

It will be apparent that the components of the tilt tray sorter 100 disclosed herein are provided only for illustrative purposes. Any modification to the current design and overall operation may be well appreciated, without departing from the scope of the disclosure.

Figure 3B:
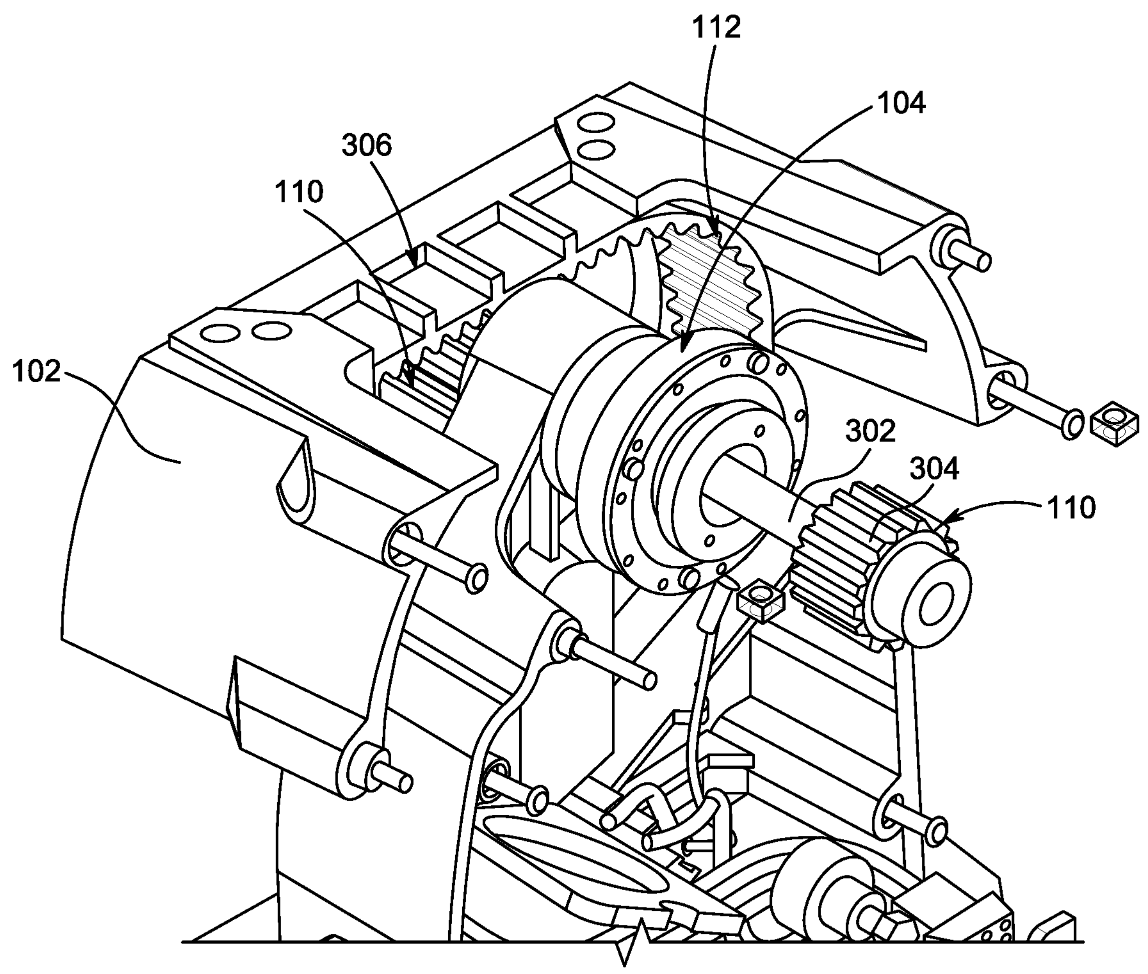
FIG. 3B illustrates an enlarged sectional view of the tilt tray sorter in accordance with an example embodiment of the present disclosure.
Figure 3C:
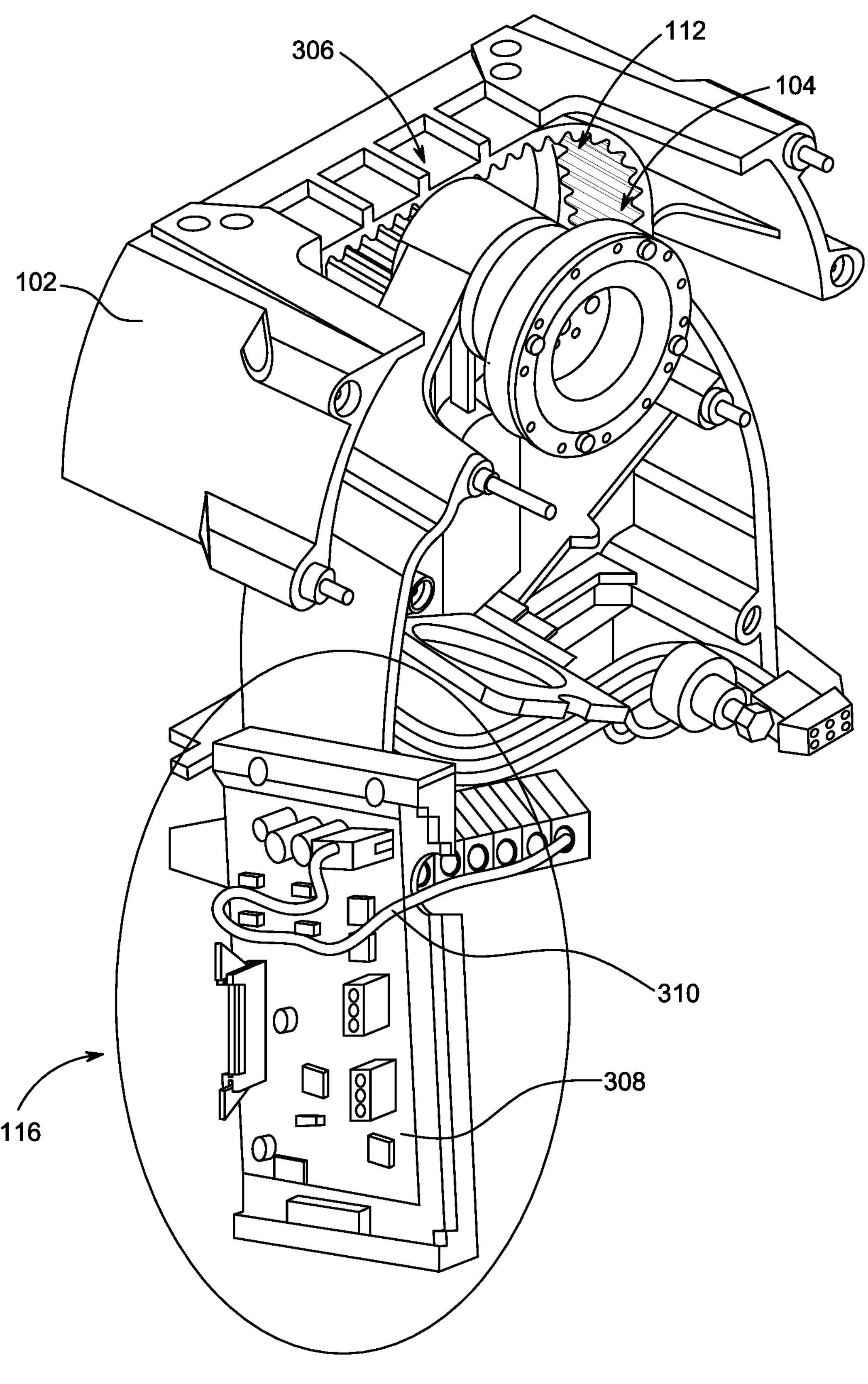
FIG. 3C illustrates another sectional view of the tilt tray sorter with the control card in accordance with an example embodiment of the present disclosure.

FIG. 3A illustrates an sectional view of the tilt tray sorter 100, in accordance with an example embodiment of the present disclosure. FIG. 3B illustrates an enlarged sectional view of the tilt tray sorter 100, in accordance with an example embodiment of the present disclosure. FIG. 3C illustrates another sectional view of the tilt tray sorter with a control card 308, in accordance with an example embodiment of the present disclosure.

As discussed earlier, the tilt tray sorter 100 may comprise the strain wave gear 104 and the motor 114 coupled to the strain wave gear 104 along a shaft 302 of the tilt tray shaft assembly 106. The motor 114 may actuate the strain wave gear 104, and the shaft 302 of the tilt tray shaft assembly 106 may rotate. The rotational motion of the shaft 302 may be transferred to the gear 110 and an outer gear profile 304 of the gear 110 may impart motion to the inner gear profile 112 of the housing 102. In some embodiments, the gear 110 may rotate within a predefined path monolithic within the housing 102. Further, the rotation of the gear 110 provides a pivoted movement to the housing 102 that further facilitates rotation of the tray 404 at one or more predefined angles, e.g., 1 to 45 degrees.

The tilt tray sorter 100 may comprise a plurality of slots 306 that may be fabricated on the housing 102 of the tilt tray sorter 100. The plurality of slots 306 may be disposed on top surface of the housing 102. In some embodiments, the plurality of slots 306 may be provided to couple the tray 404 over the top surface of the housing 102. It may be noted that the plurality of slots 306 may be disposed above the inner gear profile 112 of the housing 102, that may be rotated by the outer gear profile 304 of the gear 110.

As illustrated in FIG. 3C, the one or more processors 116 may be communicatively coupled to the motor 114. The one or more processors 116 may be configured to send the signal or the command to the motor 114 for titling the tray 404 at the one or more predefined angles, e.g., 1 to 45 degrees. In some embodiments, the one or more processors 116 may correspond to the control card 308 that may be coupled to the tilt tray sorter 100. The control card 308 may be a circuit board having input/output circuitry 310 configured to transmit command signals to the motor 114 to ON and OFF the motor 114. In some embodiments, the command signals may be transmitted automatically or manually. In some embodiments, the command signals from the one or more processors 116 may be put automatically, upon detection of packages. In some other embodiments, the one or more processors 116 may automatically activate the motor 114 upon detection of the packages.

Figure 4A:
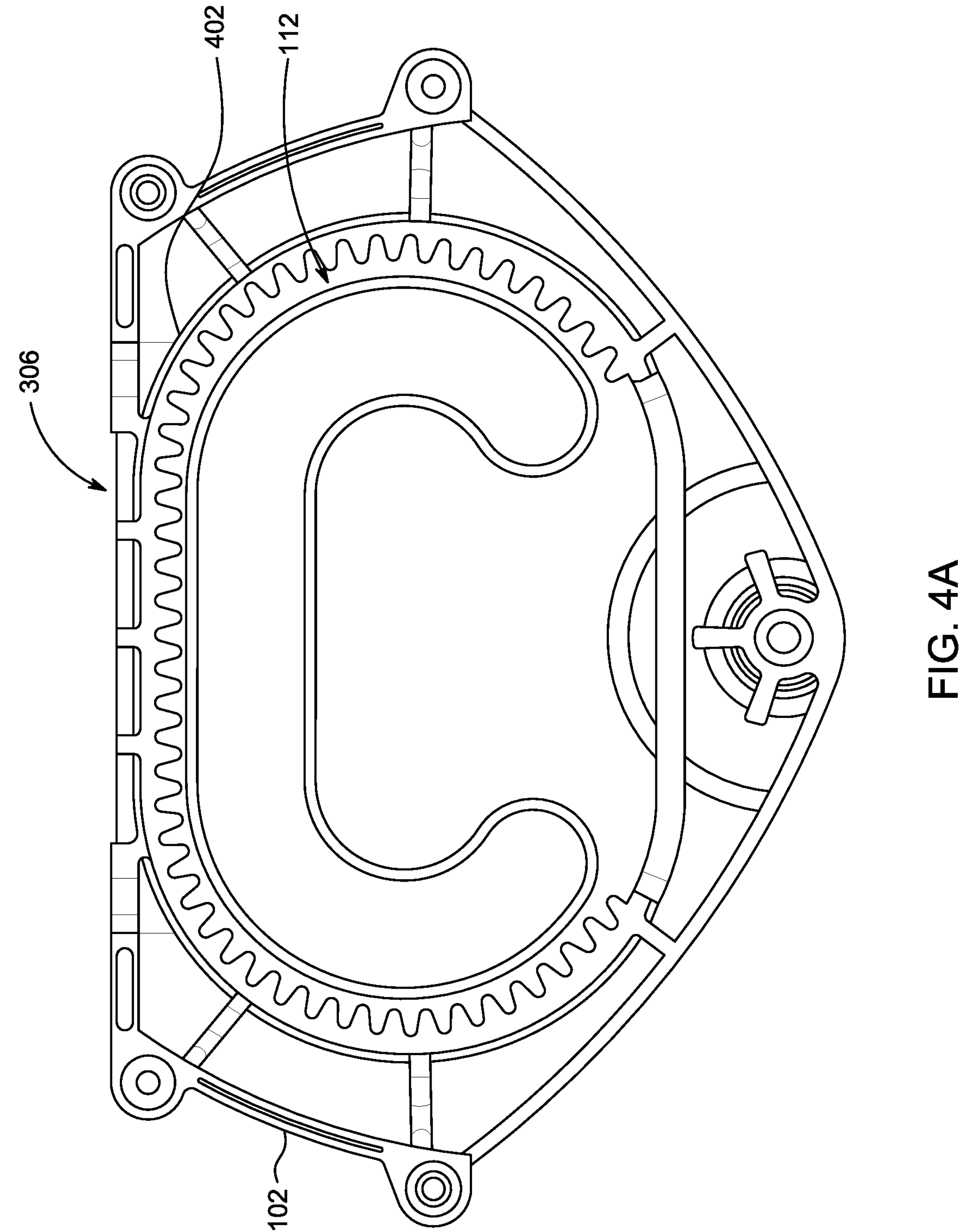
FIG. 4A illustrates a front view of the tilt tray sorter having a predefined path in accordance with an example embodiment of the present disclosure.
Figure 4B:
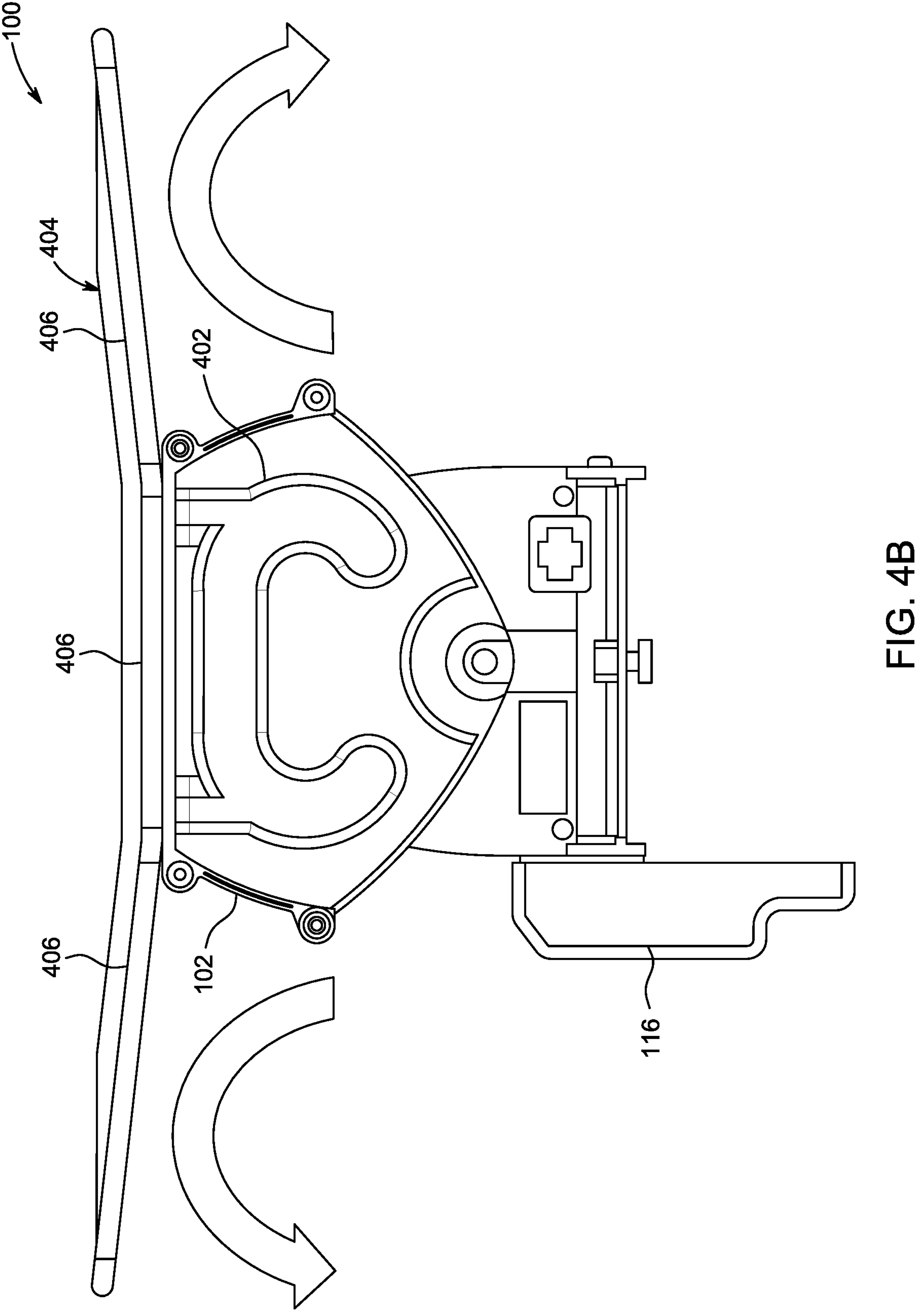
FIG. 4B illustrates a front view of the tilt tray sorter coupled with a tray in accordance with an example embodiment of the present disclosure.

FIG. 4A illustrates a front view of the tilt tray sorter 100 having a predefined path 402, in accordance with an example embodiment of the present disclosure. FIG. 4B illustrates a front view of the tilt tray sorter coupled with a tray 404, in accordance with an example embodiment of the present disclosure.

As discussed earlier, the tilt tray sorter 100 may comprise the housing 102 enclosing the inner gear profile 112 that may be meshed with the outer gear profile 304 of the gear 110. The inner gear profile 112 may be disposed on the predefined path 402. In some embodiments, the teeth of the inner gear profile 112 of the predefined path 402 may mesh with the outer gear profile 304 of the gear 110. Therefore, the rotational motion of the gear 110 may impart rotational motion into the predefined path 402.

As illustrated in FIG. 4B, the tit tray sorter 100 may comprise a tray 404 that may be disposed over the housing 102. The tray 404 may be disposed within the plurality of slots 306 of the housing 102. Therefore, the rotational motion of the housing 102 may rotate the tray 404 in the one or more predefined angles, e.g., 1 to 45 degrees. Further, the tray 404 may comprise at least three plates 406 with plates on either sides coupled to a middle plate at certain inclination with respect to the middle plate. In various example, the tray 404 may comprise a proximal portion positioned between two distal portions, the distal portions may be positioned at an upward angle relative to the proximal portion. This configuration may ensure that an object on the tray 404 remains within the tray 404 when the tray 404 is not tilted.

As discussed, the motor 114 may produce a first rotational movement, and the movement generated by the motor 114 may be transmitted to the flexspline 204. In some embodiments, due to the shape of the flexspline 204, the reduction may be made. The movement from the flexspline 204 may be transmitted to the shaft 302 of the tilt tray shaft assembly 106. In some embodiments, the flexspline 204 may be configured to increase torque and reduce speed in comparison to the motor 114. In some example embodiments, the shaft 302 may have at least one gear at each end, as illustrated in FIG. 3B. It may be noted that each gear may move with the shaft 302 along a predefined path in the tilt tray sorter 100 which may give the 45 degrees' tilt to the tray 404. In some embodiments, each gear 110 may rotate within the predefined path of monolithic within the housing 102 to facilitate a pivoted movement to the housing 102 that further provides rotation to the tray 404 at the one or more predefined angles, e.g., 1 to 45 degrees. Therefore, the strain wave gear 104 may unload packages coming to a surface of the tray 404. In some example embodiments, the tilt tray sorter 100 may unload or divert or sort once the packages coming from a conveyor belt (not shown) over the surface of the tray 404.

The present disclosure presents efficient technology results in a reduction in number of components and necessitating less frequent maintenance. In some embodiments, the strain wave gear 104 enables precise and controlled rotation of the tilt tray shaft assembly for unloading packages. Such efficient and reduced application of components yield cost savings. In some embodiments, the present disclosure offers improved operational efficiency and reduced maintenance requirements and promises cost-effectiveness through component optimization.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A tilt tray sorter comprising:

a housing having an inner gear profile and a top surface;

a tray comprising at least three plates, including a middle plate and two side plates, wherein the two side plates are inclined relative to the middle plate to define a proximal portion between two upward-angled distal portions;

a plurality of slots fabricated on the top surface of the housing and disposed above the inner gear profile, wherein the plurality of slots are configured to couple the tray to the housing;

a gear disposed within the housing and configured to rotate within a predefined monolithic path defined by the housing, wherein the gear comprises an outer gear profile configured to mesh with the inner gear profile of the housing;

a strain wave gear comprising:

a wave generator coupled to a motor, the wave generator configured to rotate upon actuation of the motor;

a flexspline mounted around the wave generator; and a circular spline positioned around the flexspline, wherein the flexspline is configured to rotate within the circular spline in response to the rotation of the wave generator; and a tilt tray shaft assembly that comprises a shaft, wherein the shaft comprises a flange and the flange is coupled to the flexspline of the strain wave gear, and wherein the tilt tray shaft assembly is configured to rotate when the flexspline rotates and the tilt tray shaft assembly is operatively coupled to the gear such that rotation of the gear within the predefined monolithic path induces a pivoting motion of the housing and the tray at one or more predefined angles.

2. The tilt tray sorter of claim 1, wherein the circular spline is fabricated with the inner gear profile and the flexspline is fabricated with an outer gear profile.

3. The tilt tray sorter of claim 2, wherein the flexspline is positioned within the circular spline such that the outer gear profile of the flexspline meshes with the inner gear profile of the circular spline to provide rotational movement to the flexspline.

4. The tilt tray sorter of claim 2, wherein the wave generator has an elliptical shaped profile, wherein the rotation of the wave generator facilitates creation of a wave within the flexspline that causes a relative movement between the flexspline and the circular spline due to meshing of the outer gear profile of the flexspline and the inner gear profile of the circular spline.

5. The tilt tray sorter of claim 1, wherein the one or more predefined angles correspond to 1 to 45 degrees.

6. The tilt tray sorter of claim 1, wherein motor is communicatively coupled to one or more processors.

7. The tilt tray sorter of claim 6, wherein the one or more processors are configured to send a signal or a command to the motor for tilting the tray.

8. The tilt tray sorter of claim 1, wherein the flexspline is configured to increase torque and reduce speed in comparison to the motor.

9. The tilt tray sorter of claim 1, wherein the motor corresponds to a direct current (DC) motor.

10. A tilt tray sorter comprising:

a housing having an inner gear profile and a top surface;

a tray comprising at least three plates, including a middle plate and two side plates, wherein the two side plates are inclined relative to the middle plate to define a proximal portion between two upward-angled distal portions;

a plurality of slots fabricated on the top surface of the housing and disposed above the inner gear profile, wherein the plurality of slots are configured to couple the tray to the housing;

a strain wave gear comprising:

a wave generator coupled to a motor, the wave generator configured to rotate upon actuation of the motor;

a flexspline mounted around the wave generator; and a circular spline positioned around the flexspline, wherein the flexspline is configured to rotate within the circular spline in response to the rotation of the wave generator; and a tilt tray shaft assembly comprising a shaft, the shaft including a flange and a gear, wherein the flange is coupled to the flexspline, and the gear includes an outer gear profile;

wherein the tilt tray shaft assembly is configured to rotate when the flexspline rotates, and the gear is configured to rotate within a predefined monolithic path within the housing to induce a pivoting motion of the tray at one or more predefined angles.

11. The tilt tray sorter of claim 10, wherein the circular spline is fabricated with an inner gear profile and the flexspline is fabricated with an outer gear profile.

12. The tilt tray sorter of claim 11, wherein the flexspline is positioned within the circular spline such that the outer gear profile of the flexspline meshes with the inner gear profile of the circular spline to provide rotational movement to the flexspline.

13. The tilt tray sorter of claim 11, wherein the wave generator has an elliptical shaped profile, wherein the rotation of the wave generator facilitates creation of a wave within the flexspline that causes a relative movement between the flexspline and the circular spline due to meshing of the outer gear profile of the flexspline and the inner gear profile of the circular spline.

14. The tilt tray sorter of claim 10, wherein the one or more predefined angles correspond to 1 to 45 degrees.

15. The tilt tray sorter of claim 10, further comprising and one or more processors communicatively coupled to the motor, wherein the one or more processors are configured to send a signal or a command to the motor for tilting the tray at the one or more predefined angles.

16. The tilt tray sorter of claim 10, wherein the flexspline is configured to increase torque and reduce speed in comparison to the motor.

17. The tilt tray sorter of claim 10, wherein the outer gear profile of the gear is configured to mesh with the inner gear profile of the housing.

* * * * *